(12) United States Patent
Perdrigeon et al.

(10) Patent No.: US 11,982,316 B2
(45) Date of Patent: May 14, 2024

(54) DEVICE FOR DISTRIBUTING OIL FROM A ROLLING BEARING FOR AN AIRCRAFT TURBINE ENGINE

(71) Applicant: SAFRAN AIRCRAFT ENGINES, Paris (FR)

(72) Inventors: Christophe Marcel Lucien Perdrigeon, Moissy-Cramayel (FR); Régis Eugène Henri Servant, Moissy-Cramayel (FR); Guillaume François Jean Bazin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 211 days.

(21) Appl. No.: 17/634,282

(22) PCT Filed: Aug. 17, 2020

(86) PCT No.: PCT/FR2020/051470
§ 371 (c)(1),
(2) Date: Feb. 10, 2022

(87) PCT Pub. No.: WO2021/032924
PCT Pub. Date: Feb. 25, 2021

(65) Prior Publication Data
US 2022/0325753 A1   Oct. 13, 2022

(30) Foreign Application Priority Data

Aug. 19, 2019   (FR) ..................................... 1909267

(51) Int. Cl.
*F16C 19/06*   (2006.01)
*F01D 25/16*   (2006.01)
(Continued)

(52) U.S. Cl.
CPC .......... *F16C 33/6659* (2013.01); *F01D 25/16* (2013.01); *F01D 25/18* (2013.01);
(Continued)

(58) Field of Classification Search
CPC .. F16C 19/06; F16C 33/6659; F16C 33/6677; F16C 33/6681; F16C 35/073;
(Continued)

(56) References Cited

U.S. PATENT DOCUMENTS 6,409,464 B1    6/2002  Fisher et al.
9,810,095 B2   11/2017  Morreale et al.
(Continued)

FOREIGN PATENT DOCUMENTS

EP   2657463 A1 * 10/2013   ............. F01D 25/18
EP   3018303 A1 *  5/2016   ............. F01D 25/16
(Continued)

OTHER PUBLICATIONS

English Translation of the International Search Report dated Dec. 17, 2020, issued in corresponding International Patent Application No. PCT/FR2020/051470, filed Aug. 17, 2020, 2 pages.
(Continued)

*Primary Examiner* — Phillip A Johnson
(74) *Attorney, Agent, or Firm* — Christensen O'Connor Johnson Kindness PLLC

(57) ABSTRACT

Devices for distributing oil to a rolling bearing for an aircraft turbine engine include a rolling bearing including two rings, respectively an inner ring and an outer ring, an oil distribution ring configured to be mounted on a turbine engine shaft, said distribution ring including a first outer cylindrical surface for mounting the inner ring of the bearing, an oil recovery scoop supplying a lubricating circuit of the bearing, and an annular track of a dynamic seal. The distribution ring and the track are formed by a single-piece body, and the
(Continued)

lubricating circuit is formed in said body and extends into the distribution ring and the track.

10 Claims, 5 Drawing Sheets

(51) Int. Cl.
  *F01D 25/18* (2006.01)
  *F16C 33/66* (2006.01)
  *F16C 35/073* (2006.01)
(52) U.S. Cl.
  CPC .......... *F16C 19/06* (2013.01); *F16C 33/6677* (2013.01); *F16C 33/6681* (2013.01); *F16C 35/073* (2013.01); *F05D 2240/50* (2013.01); *F05D 2260/98* (2013.01); *F16C 2360/23* (2013.01)
(58) Field of Classification Search
  CPC ...... F16C 2360/23; F01D 25/16; F01D 25/18; F05D 2240/50; F05D 2260/98
  See application file for complete search history.

(56) References Cited

U.S. PATENT DOCUMENTS 9,897,005 B2 * 2/2018 Chilton .................... F16N 7/32
9,932,860 B2 * 4/2018 Stutz ....................... F01D 25/18
10,422,341 B2 9/2019 Brault et al.
2018/0142733 A1 5/2018 Venter

FOREIGN PATENT DOCUMENTS

| FR | 2929358 A1 * | 10/2009 | ............ F16C 19/163 |
| FR | 2951227 A1 | 4/2011 | |
| FR | 3035154 A1 | 10/2016 | |
| FR | 3066549 A1 | 11/2018 | |
| WO | 2015075355 A1 | 5/2015 | |

OTHER PUBLICATIONS

English Translation of the Written Opinion of the International Searching Authority dated Dec. 17, 2020, Issued in corresponding International Patent Application No. PCT/FR2020/051470, filed Aug. 17, 2020, 3 pages.
Written Opinion of the International Searching Authority dated Dec. 17, 2020, issued in corresponding International Patent Application No. PCT/FR2020/051470, filed Aug. 17, 2020, 4 pages.
International Preliminary Report on Patentability dated Feb. 17, 2022, issued in corresponding International Patent Application No. PCT/FR2020/051470, filed Aug. 17, 2020, 1 page.

* cited by examiner

[Fig.1]
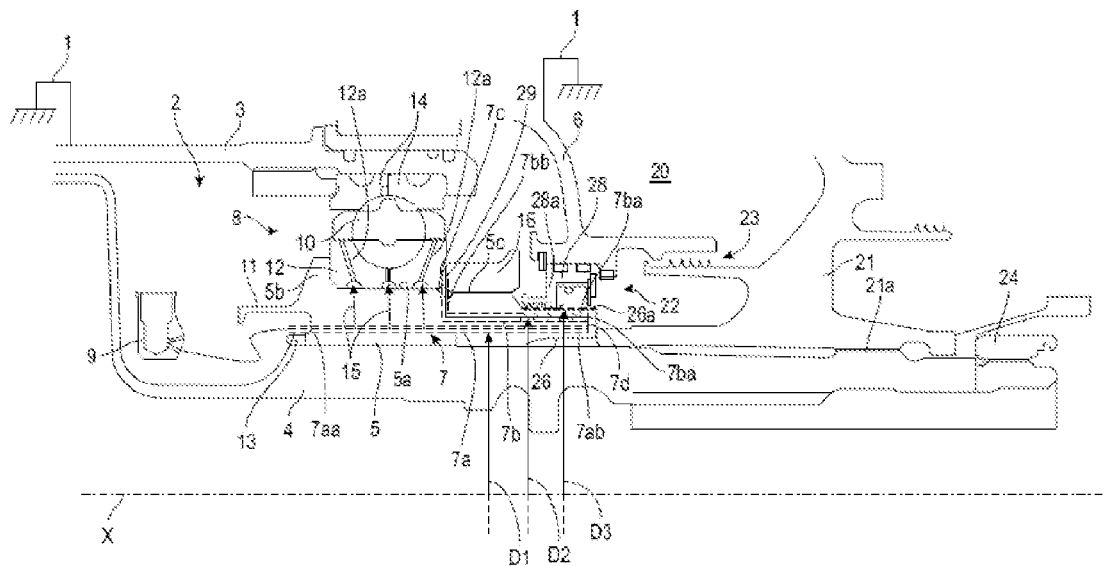
[Fig.2]
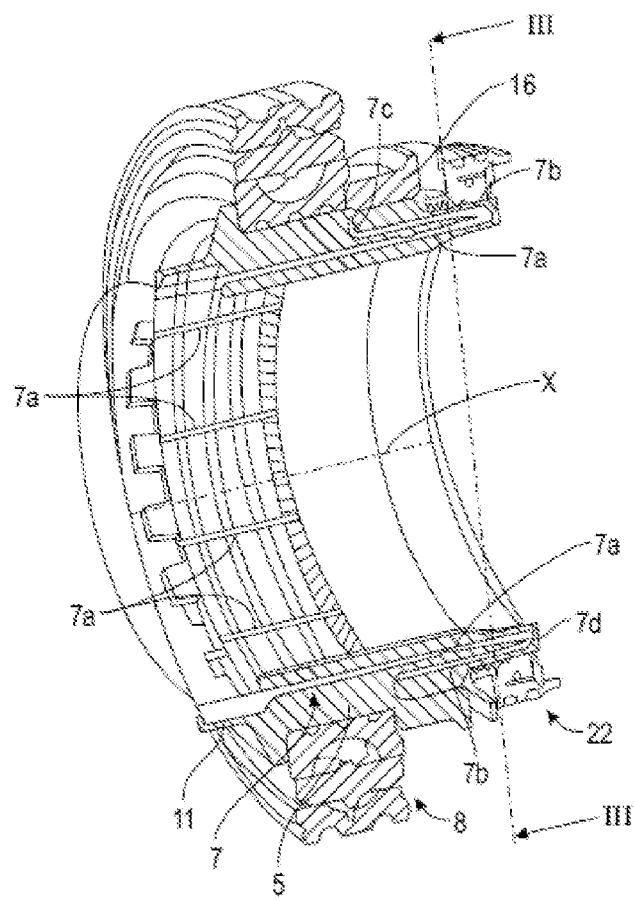

[Fig.3]
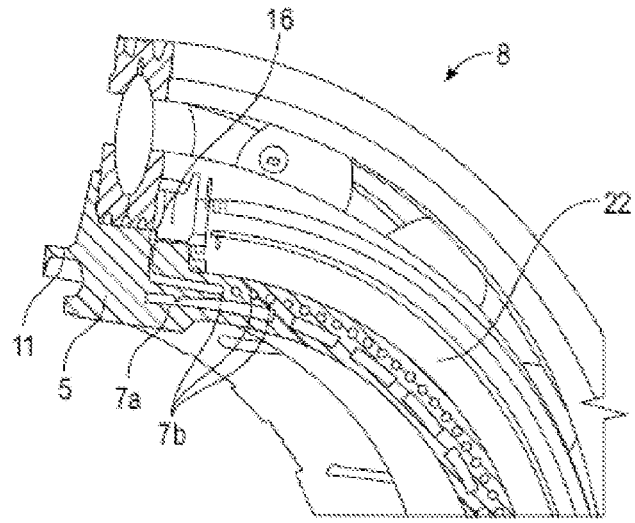
[Fig.4]
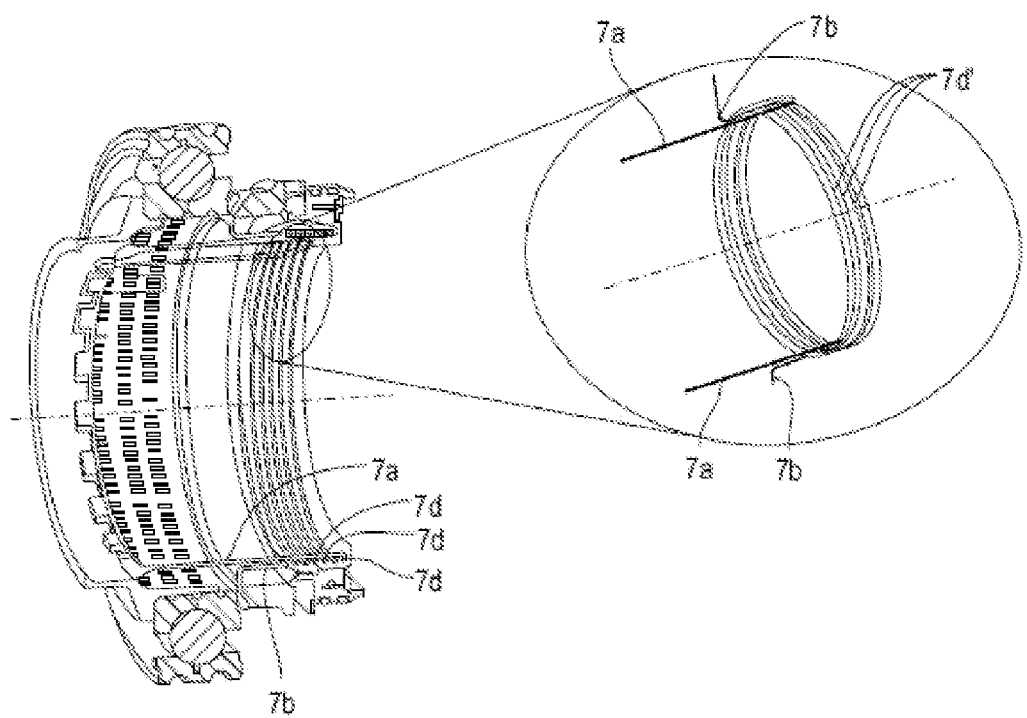

[Fig.5]
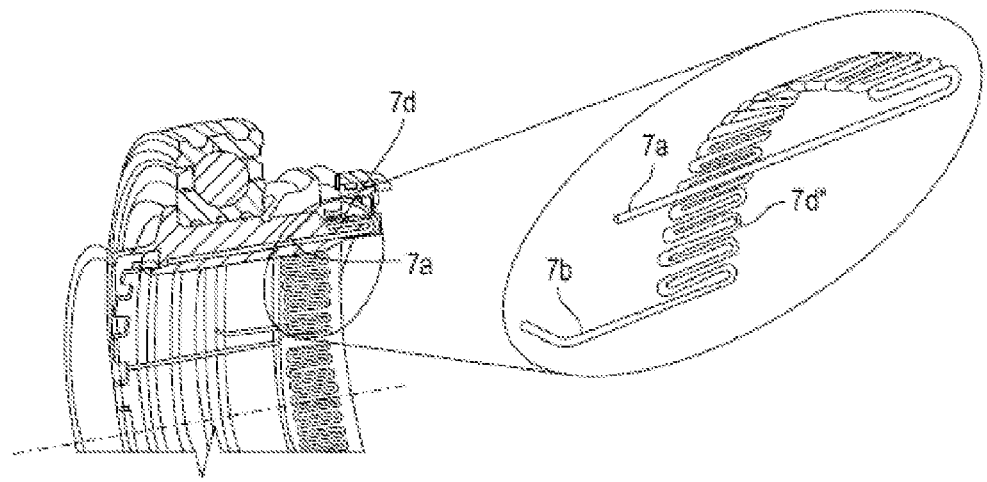
[Fig.6]
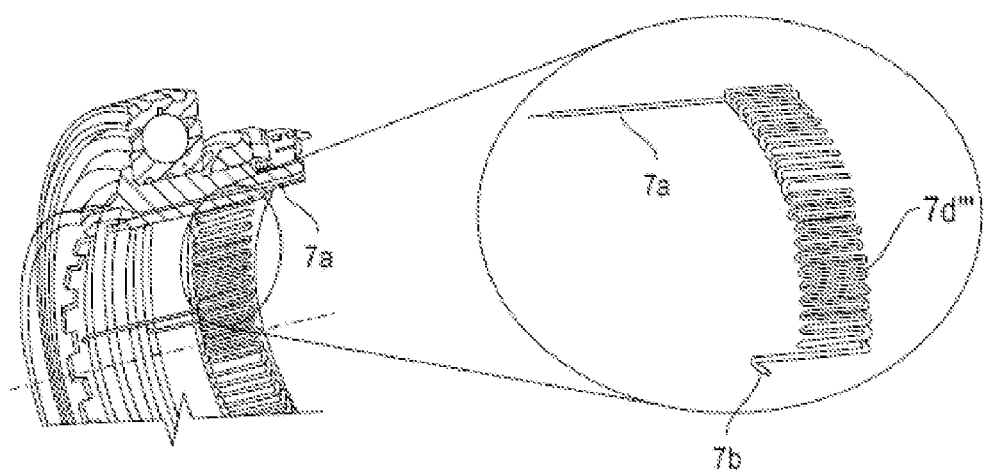

[Fig.7]
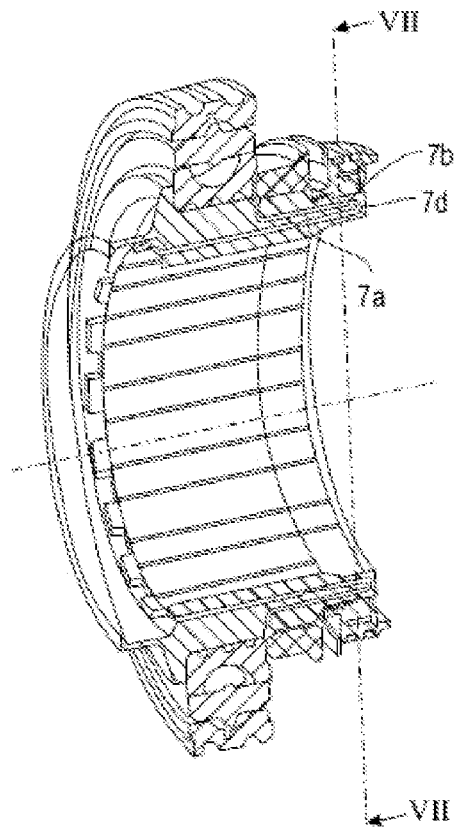
[Fig.8]
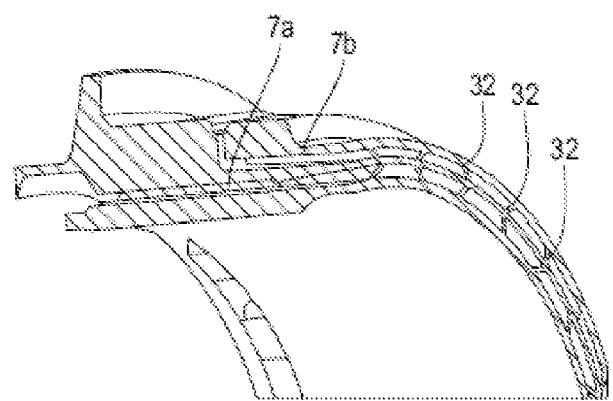

[Fig.9]
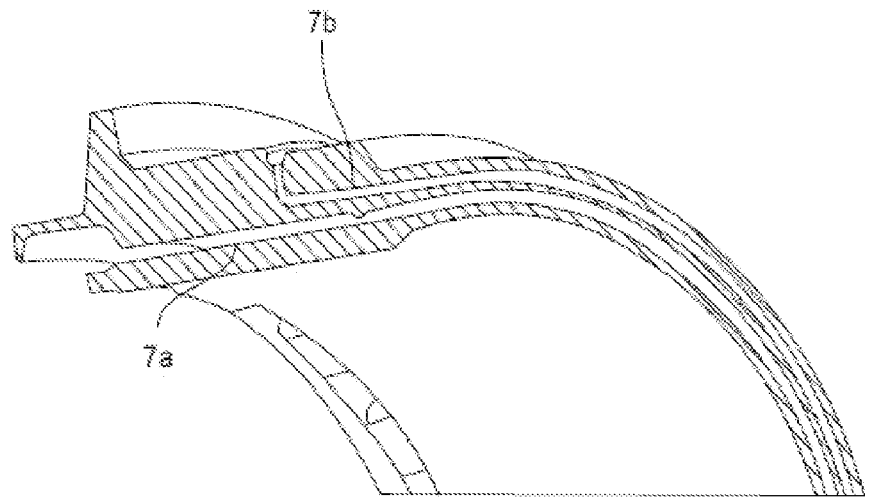
[Fig.10]
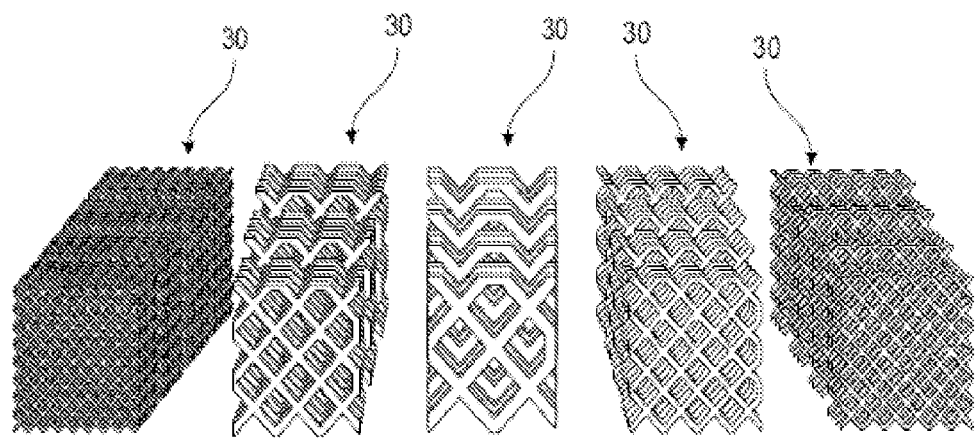

DEVICE FOR DISTRIBUTING OIL FROM A ROLLING BEARING FOR AN AIRCRAFT TURBINE ENGINE

CROSS-REFERENCES TO RELATED APPLICATIONS

This application is a National Stage of International Application No. PCT/FR2020/051470, filed Aug. 17, 2020, which claims priority to French Patent Application No. 1909267, filed Aug. 19, 2019, the entire disclosures of which are hereby incorporated by reference.

TECHNICAL FIELD OF THE INVENTION

The present invention relates to a device for distributing oil from a rolling bearing for an aircraft turbine engine.

TECHNICAL BACKGROUND

The prior art comprises, but is not limited to the documents FR-A1-3 035 154, FR-A1-3 066 549, and WO-A1-2015/075355.

In a known way, a turbine engine comprises a certain number of rolling bearings which are intended to support the rotor of the turbine engine in rotation, in particular with respect to a fixed support such as the casing of the latter.

During operation, the oil is typically injected on the roller bearing of these bearings to lubricate and cool them. To prevent the oil from spreading throughout the engine, it is necessary to confine the rolling bearings inside oil enclosures and to seal these oil enclosures from air enclosures adjacent to the engine, which must be free of oil.

More precisely, some oil enclosures are delimited between the shaft supported in rotation by the rolling bearing and an annular cover integral with a fixed support linked to the turbine engine casing and arranged around the shaft. A dynamic annular seal is typically positioned between the shaft and the cover to provide a seal between the oil enclosure and an adjacent air enclosure. Typically, the dynamic seal is mounted inside a flange that is attached to the cover.

The dynamic seals typically used in the rolling bearing oil enclosures for a turbine engine are segmented radial seals (JRS), comprising a plurality of annulus segments distributed circumferentially around a seal track rotating with the shaft of the rotor. These segments are in sliding contact with the seal track. The friction between the segments of the seal and the seal track generates heat that must be dissipated in order to maintain the mechanical integrity of these elements. One technique is to circulate cooling oil along the inner wall of the seal track.

The dynamic seal can be located right next to a rolling bearing that is lubricated by oil during operation. It is known to lubricate a rolling bearing by means of an oil distribution ring. The rolling bearing is mounted on the oil distribution ring, which comprises a scoop for collecting oil sprayed by a sprinkler, in order to recover this oil and supply a circuit configured for lubricating the bearing.

The present invention provides an improvement to this technology which, in particular, allows to optimize the cooling of the track of a dynamic seal, for example of the JRS type, arranged next to a lubricated rolling bearing.

SUMMARY OF THE INVENTION

The invention relates to a device for distributing oil from a rolling bearing for an aircraft turbine engine, comprising:

a rolling bearing comprising two rings, respectively inner and outer,
an oil distribution ring configured to be mounted on a turbine engine shaft, this distribution ring comprising:
i) a first outer cylindrical surface for mounting the inner ring of the bearing, and
ii) an oil recovery scoop supplying a circuit configured for lubricating said bearing,
an annular track of a dynamic seal, in particular of the JRS type,
characterised in that said distribution ring and said track are formed by a single-part body, and in that said lubricating circuit is formed in this body and extends into the distribution ring and the track.

On the one hand, the invention allows to reduce the number of parts and therefore the design of the device since its body integrates several functions, namely that of the distribution ring which supports and lubricates the bearing, as well as that of the track of the dynamic seal. This allows the device to have a smaller overall dimension, especially radial and axial dimensions, compared to the prior art. The invention also allows to simplify the oil circuit, which is used both for lubricating the bearing and for cooling the seal track. Indeed, the circulation of oil near this track allows it to be cooled by thermal conduction, which is particularly advantageous. The passage of oil from the scoop into the body and from the ring to the track does not necessarily require a special sealing system, which also limits the risk of uncontrolled oil leakage during operation. In addition, the reduction of the diameter of the track results in the reduction of the leakage cross-section to be sealed by the dynamic seal, which further improves the efficiency of the sealing device.

The device according to the invention may comprise one or more of the following characteristics, taken alone or in combination with each other:

said body comprises a second outer cylindrical surface for supporting the seal, and wherein said circuit comprises at least one first channel of elongated shape comprising a first axial end opening at the level of said scoop, and a second opposite axial end surrounded by said second surface, said circuit comprises at least one second elongated channel comprising a third axial end connected to the second axial end of said at least one first channel, and an opposite fourth axial end opening at the level of or at the vicinity of said first surface.

said at least one first channel is located on a circumference centred on an axis of the bearing, which has a diameter $D1$, and said at least one second channel is located on a circumference centred on this axis, which has a diameter $D2$, with $D1$ less than $D2$ which is itself less than the diameter $D3$ of said second surface, the second and third ends are connected to each other by at least one bent conduit, and/or at least one zig-zag conduit, and/or at least one spiral or helical conduit, said at least one first channel and/or said at least one second channel is/are at least partly filled with a honeycomb structure forming a lattice, said at least one first channel and/or said at least one second channel has/have a generally circular, triangular, rectangular or trapezoidal cross-sectional shape, said body comprises an annular shoulder for bearing a first axial end of the inner ring, said body further comprising a thread for screwing a nut configured to bear on a second opposite axial end of the inner ring, said at least one second channel has its fourth end opening between said first surface and said thread, preferably facing at least one third channel formed in said nut, said thread is located between said first and second surfaces, said scoop is located at a first axial end of said body, and said track (or said second surface) is located at a second opposite axial end of the body, said body comprises at a first axial end an annular row of dog teeth, and said body comprises at a second opposite axial end a support stop.

The invention further relates to a turbine engine, in particular for an aircraft, comprising at least one device as described above.

The turbine engine according to the invention may comprise one or more of the following characteristics, taken in isolation from each other, or in combination with each other:

the turbine engine comprises a shaft around which the device is mounted as well as a trunnion, the body of the device being clamped axially between an annular shoulder of the shaft and the trunnion which is urged axially into abutment against the body by screwing a nut onto the shaft, and the turbine engine comprises an oil sprinkler in an annular space delimited by said scoop, and in particular between the scoop and said shaft.

BRIEF DESCRIPTION OF FIGURES

Further characteristics and advantages will be apparent from the following description of a non-limiting embodiment of the invention with reference to the appended drawings in which:

FIG. 1 is a partial schematic half-view in axial section of a turbine engine comprising an oil distribution device according to one embodiment of the invention, FIG. 2 is a partial schematic view of the device of FIG. 1 in perspective and axial section, FIG. 3 is a partial schematic view in perspective and in axial and cross-section of the device of FIG. 1, the cross-section being made along the line III-III of FIG. 2, FIG. 4 is a view similar to that of FIG. 2 and representing an alternative embodiment of the device, the detail view representing a portion of a lubricating oil circuit, FIG. 5 is a view similar to that of FIG. 2 and representing another variant embodiment of the device, the detail view representing a portion of a lubricating oil circuit, FIG. 6 is a view similar to that of FIG. 2 and representing another variant embodiment of the device, the detail view representing a portion of a lubricating oil circuit, FIG. 7 is a view similar to that of FIG. 2 and illustrating another variant embodiment of the device, FIG. 8 is a partial schematic view in perspective and in axial and cross-section of the device of FIG. 7, the cross-section being made along the line VII-VII of FIG. 7, FIG. 9 is a partial schematic perspective view and axial and cross section of another variant embodiment of the device, and FIG. 10 shows schematic examples of lattice honeycomb structures.

DETAILED DESCRIPTION OF THE INVENTION

FIG. 1 shows a partial schematic of an oil enclosure 2 of an aircraft turbine engine bearing.

This oil enclosure 2 is bounded on the inside by a shaft 4 rotating about an axis X, and on the outside by an annular cover 6 and a bearing support 3 which are integral with a casing 1 of the turbine engine and which is arranged around the shaft 4.

An oil distribution ring 5 is arranged around the shaft 4 coaxially to it, and is rotationally integral with it.

The oil enclosure 2 contains a bearing 8 comprising a plurality of rolling-elements 10 engaged between an inner ring 12 mounted on the distribution ring 5, preferably by shrink-fitting, and an outer ring 14 integral with the bearing support 3 fixed to the casing 1 of the turbine engine. The bearing support 3 can have some flexibility.

In the example shown in the figures, the rolling-elements 10 are balls. Nevertheless, the type of bearing or rolling-elements is not limiting in the scope of the present invention.

Oil is injected into the oil enclosure 2 to lubricate and cool the rolling-elements 10 of the bearing. For this purpose, oil flows through a lubricating circuit 7 integrated in the distribution ring 5 to an outer cylindrical surface 5a of the distribution ring 5, which is used for mounting the inner ring 12.

The oil is supplied by an oil sprinkler 9, which is here located upstream of the distribution ring 5 (the terms "upstream" and "downstream" here refer to the general flow of the gases in the turbine engine). The ring 5 has a generally annular shape around the axis X and comprises at its upstream end a scoop 11 for collecting the oil projected by the sprinkler 9. This scoop is in the form of a cylindrical rim oriented upstream in the example shown. The scoop 11 extends around and away from the shaft 4 and defines with it an annular space for receiving oil from the sprinkler 9.

The oil circuit 7 comprises at least one inlet opening at the upstream end of the distribution ring 5, in the aforementioned oil receiving space.

In the example shown, this inlet is formed by an upstream end 7aa of at least one channel 7a that has an elongated shape along the axis X and which comprises a downstream end 7ab located at the level of the downstream end of the distribution ring 5.

Also, at its upstream end, the ring 5 comprises an annular row of dog teeth 13 that are oriented axially upstream and are engaged between complementary dog teeth on the shaft 4. This cooperation allows to rotationally secure the ring 5 to the shaft 4. As seen in the drawing, the end 7aa is located radially between the dog teeth 13 and the scoop 11.

Oil conduits 15 oriented substantially radially to the axis X extend from the channel 7a to the surface 5a of the ring 5 for the lubrication of the bearing 8.

The inner ring 12 of the bearing 8 also comprises an integrated oil circuit 12a for circulating the oil supplied by the circuit 7 of the ring 5 to lubricate the rolling-elements and their cage. The inner ring 12 rests axially upstream on an annular shoulder 5b of the ring 5. Downstream of the surface 5a for mounting the inner ring 12, the distribution ring 5 comprises an outer thread 5c for screwing on a nut 16 that rests axially on the downstream end of the ring 12 in order to clamp it axially against the shoulder 5b.

The oil enclosure 2 further comprises a sealing system intended for sealing this oil enclosure from an adjacent air enclosure 20 which must be free of oil.

For this purpose, the sealing system comprises in particular a dynamic annular seal 22. Typically, this dynamic seal 22 is composed of carbon annulus segments. The dynamic seal 22 is held in an annular flange 28 which is itself mounted inside the cover 6.

The flange 28 has a portion 28a with an L-shaped cross-section that receives the dynamic seal 22.

The dynamic annular seal 22 is associated with a seal track 26, which is rotatable and carried by the shaft 4. The track 26 comprises a contact surface 26a, in sliding contact with the dynamic annular seal 22. The contact surface 26a and the track 26 are treated to improve the seal/track sliding and minimize the wear of the dynamic annular seal 22.

The sealing system also comprises a labyrinth seal 23 arranged downstream of the dynamic seal 22, between a trunnion 21 mounted on the shaft 4 and the cover 6.

The trunnion 21 is rotationally integral with the shaft 4 by means of splines 21a. The trunnion 21 is located downstream of the distribution ring 5 and comprises an upstream end axially bearing against the downstream end of the ring 5, this downstream end forming an axial stop. A nut 24 is screwed onto the shaft 4, downstream of the trunnion 21, in order to press it axially against the ring 5, which is itself held axially tight against the dog teeth of the shaft 4. In addition, the ring 5 is preferably shrunk onto the shaft 4 to ensure its centring.

According to a characteristic of the invention, the distribution ring 5 and the track 26 of the dynamic seal 22 are formed in a single-part, for example by additive manufacturing. The ring 5 and the track 26 are thus formed by a single-part body which integrates the circuit 7.

As seen in the drawings, the circuit 7 extends axially downstream to the track 26 for conductive cooling of the surface 26a.

The aforementioned channel 7a thus has its downstream end 7ab located closest to the downstream end of the track 26 and the body, and is surrounded by the surface 26a. In the example shown, the channel 7 is straight and located on a circumference centred on the axis X having a diameter D1. The surface 26a is located on a circumference centred on this axis X of diameter D3.

The circuit 7 comprises at least one other channel 7b that is generally elongated and preferably straight and is located on a circumference centred on the axis X of diameter D2. D1 is less than D2 which is less than D3, meaning that the channel 7b extends between the channel 7a and the surface 26a.

The channel 7b has a downstream end 7ba connected to the downstream end 7ab of the channel 7a and an upstream end 7bb that opens onto the surface 5a, or into the thread 5c, or between the surface 5a and the thread 5c, as in the example shown. This end 7bb may be bent in an L-shape and comprise a portion oriented radially outwards and opening, for example, into an annular groove 7c provided on the ring 5, which opens radially outwards.

The connection of the ends 7ab and 7ba can be realized by at least one C-bent conduit 7d for example.

The nut 16 may comprise at least one integrated oil circulating channel 29, which is intended to receive oil from the groove 7c. This channel 29 is, for example, inclined from upstream to downstream radially outwards and comprises a radially inner end opening facing the groove 7c, and a radially outer end opening outwards for the purpose of projecting oil outwards. This allows the nut 16 to function as a centrifugal drop thrower, which allows the oil used to lubricate the bearing 8 and/or to cool the seal 22 to be thrown away from this seal. The presence of oil on the seal 22 could reduce its efficiency.

The integration of the cooling circuit into the seal track 26 allows the diameter to be reduced, which has a double advantage. First of all, it reduces the radial overall dimension in this area. In addition, the friction of the seal 22 on the track 26 is less important due to the lower peripheral speeds. Finally, the section of passage between the seal 22 and the track 26 is smaller and therefore the leakages are also smaller.

FIG. 1 shows schematically the oil flow path during operation by arrows. The oil is sprayed by the sprinkler 9 into the space defined by the scoop 11 and enters the circuit 7. Oil is supplied to the bearing 8 for lubrication, and to the vicinity of the surface 26a for conductive cooling. The lubricating oil is naturally centrifuged by the bearing 8, and the cooling oil of the track 26 is conveyed to the groove 7c where it is then discharged through the channel 29 of the nut 16.

From FIGS. 2 and 3, it can be seen that the circuit 7 may comprise several channels 7a, 7b evenly spaced around the axis X. The body may comprise up to ten channels 7a or more. These channels 7a can have a circular shape in section. Their section can also change along the axis X. They can each have a circular section on an upstream segment and a rectangular section on a downstream segment.

The body may also comprise up to ten or more channels 7b. These channels 7b can have a circular shape in section. Their section can also change along the axis X. They can each have a circular section on an upstream segment and a rectangular section on a downstream segment.

The channels 7a, 7b here extend parallel to the axis X although this is not limiting.

FIGS. 4 to 7 are similar views to that of FIG. 2 and illustrate alternative embodiments of the invention and in particular of the circuit 7.

In the variant shown in FIG. 4, the circuit 7 comprises two channels 7a and two channels 7b. Each of the channels 7a is connected to one of the channels 7b by a spiral or helical shaped conduit 7d' extending around the axis X. The detail view of FIG. 4 allows to show that the conduits 7d' of the same diameter are nested inside each other.

In the embodiment shown in FIG. 5, the circuit 7 comprises channels 7a which are each connected to a channel 7b by a zig-zag conduit 7d". This conduit 7d" occupies an angular sector around the axis X (detail view of FIG. 5). The angular extent of the conduit 7d" or of this sector depends on the number of channels 7a and 7b and is for example between 30 and 60°.

In the embodiment shown in FIG. 6, the circuit 7 comprises channels 7a which are each connected to a channel 7b by a twisted conduit 7d'". This conduit 7d'" occupies an angular sector around the axis X (detail view of FIG. 6). The angular extent of the conduit 7d'" or of this sector depends on the number of channels 7a and 7b and is for example between 30 and 60°.

In the alternative embodiment shown in FIGS. 7 and 8, the circuit 7 comprises channels 7a, 7b which are generally trapezoidal in cross-section and are separated from each other by inclined partitions 32.

Finally, in the alternative embodiment of FIG. 9, the circuit 7 comprises a single channel 7a that is generally annular in shape and uninterrupted about the axis X, and a single channel 7b that is generally annular in shape and uninterrupted about the axis X. Although not visible, the connecting conduit of these channels 7a, 7b, for example with a bent cross-section, may also be annular and uninterrupted.

The channels 7a, 7b and conduits in FIG. 9 are at least partially filled with a honeycomb structure 30 forming a lattice. FIG. 10 shows some examples of such a structure 30. This structure 30 can be formed by a repetition and three-dimensional organization of predefined geometric patterns.

The structure 30 allows to stiffen the body, to increase the thermal exchanges with the oil but also to decrease the mass of this body.

In a particular embodiment of the invention, the cumulative lengths of the channels and conduits of the circuit 7 may be between 2000 and 6000 mm. The channels and conduits may have a diameter or equivalent between 1 and 5 mm.

The oil distribution device according to the invention comprises the monobloc body, which thus integrates the functions of the distribution ring and the seal track of the prior art. The ring itself can be considered as having several functions of scooping the oil from the outlet of the sprinkler, and of supporting and positioning this bearing. The oil circuit integrated in the body also has two functions of lubricating the bearing and cooling the seal track.

The additive manufacturing is a particularly suitable method to realize this body. In particular, it allows the structure 30 of FIG. 10 to be made in one single-part with the rest of the body.

The major advantages of the invention include compacting the device, eliminating parts, increasing the efficiency of the dynamic seal, and reducing the on-board mass.

The invention claimed is:

1. A device for distributing oil to a rolling bearing for an aircraft turbine engine, comprising:
   a rolling bearing comprising an inner ring and an outer ring,
   an oil distribution ring configured to be mounted on a turbine engine shaft, said distribution ring comprising:
   a first outer cylindrical surface configured for mounting the inner ring of the rolling bearing; and
   an oil recovery scoop supplying a circuit configured for lubricating said rolling bearing; and
   an annular track of a dynamic seal,
   wherein said distribution ring and said track are formed by a single-part body, and wherein said circuit is formed in the single-part body and extends into the distribution ring and the track.

2. The device according to claim 1, wherein said single-part body comprises a second outer cylindrical surface configured for supporting the seal, and wherein said circuit comprises at least one first channel of elongated shape comprising a first axial end opening at a level of said scoop, and an opposite second axial end surrounded by said second outer cylindrical surface.

3. The device according to claim 2, wherein said circuit comprises at least one second elongated channel comprising a third axial end connected to the second axial end of said at least one first channel, and an opposite fourth axial end opening at a level of said first outer cylindrical surface.

4. The device according to claim 3, wherein said at least one first channel is located on a circumference centred on an axis of the rolling bearing, wherein the circumference has a diameter D1, and said at least one second channel is located on a second circumference centred on the axis, wherein the second circumference has a diameter D2, with D1 being less than D2, wherein D2 is less than a diameter D3 of said second outer cylindrical surface.

5. The device according to claim 4, wherein the second axial end and the third axial end are connected to each other by at least one of a bent conduit, a zig-zag conduit, or a spiral or helical conduit.

6. The device according to claim 5, wherein at least one of said at least one first channel or said at least one second channel is at least partly filled with a honeycomb structure forming a lattice.

7. The device according to claim 6, wherein at least one of said at least one first channel or said at least one second channel has a cross-sectional shape selected from the group consisting of: circular, triangular, rectangular, and trapezoidal.

8. The device according to claim 7, wherein said single-part body comprises an annular shoulder configured for bearing a first axial end of the inner ring, said single-part body further comprising a thread configured for screwing a nut configured to bear on a second opposite axial end of the inner ring.

9. The device according to claim 8, wherein said at least one second channel has a fourth axial end opening between said first surface and said thread.

10. A turbine engine comprising at least one device according to claim 1.

* * * * *